(12) United States Patent
Nguyen

(10) Patent No.: US 8,023,409 B2
(45) Date of Patent: Sep. 20, 2011

(54) METHOD AND SYSTEM FOR RECONFIGURABLE PATTERN FILTERING ENGINE

(75) Inventor: Ut T. Nguyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1004 days.

(21) Appl. No.: 11/313,877

(22) Filed: Dec. 20, 2005

(65) Prior Publication Data
US 2007/0143386 A1     Jun. 21, 2007

(51) Int. Cl.
*H04J 1/16* (2006.01)
(52) U.S. Cl. .................. 370/235; 375/240.29; 725/149
(58) Field of Classification Search .............. 370/497, 370/229–235; 375/240.23, 240.29; 725/127, 725/128, 149
See application file for complete search history.

(56) References Cited

U.S. PATENT DOCUMENTS

| | | | |
|---|---|---|---|
| 6,301,308 B1 * | 10/2001 | Rector | 375/270 |
| 6,424,825 B1 | 7/2002 | Ecklund et al. | |
| 6,650,710 B1 | 11/2003 | Hamery et al. | |
| 6,781,601 B2 * | 8/2004 | Cheung | 345/629 |
| 6,798,420 B1 | 9/2004 | Xie | |
| 6,895,020 B2 | 5/2005 | Morris et al. | |
| 7,098,958 B2 | 8/2006 | Wredenhagen et al. | |
| 7,388,871 B2 | 6/2008 | Cheung et al. | |
| 7,668,270 B2 | 2/2010 | Nguyen | |
| 2003/0007568 A1 | 1/2003 | Hamery et al. | |
| 2003/0174718 A1 | 9/2003 | Sampath et al. | |
| 2004/0190513 A1 | 9/2004 | Hakkarainen et al. | |
| 2004/0199559 A1 | 10/2004 | McAdam et al. | |
| 2004/0228414 A1 * | 11/2004 | Keck et al. | 375/240.28 |
| 2005/0135700 A1 | 6/2005 | Anderson | |
| 2005/0201287 A1 * | 9/2005 | Welborn | 370/235 |
| 2007/0030276 A1 | 2/2007 | Macinnis et al. | |
| 2007/0201588 A1 | 8/2007 | Loiseau et al. | |

* cited by examiner

*Primary Examiner* — Ricky Ngo
*Assistant Examiner* — Kan Yuen
(74) *Attorney, Agent, or Firm* — McAndrews, Held & Malloy, Ltd.

(57) ABSTRACT

Methods and systems for a reconfigurable pattern filtering engine may include assembling a hardware filter from a plurality of minimum length hardware filters. A length of the assembled hardware filter may vary in multiples of a length of one of the minimum length hardware filters. The assembled hardware filter and the minimum length hardware filters may be integrated within a single chip. Specific messages in the data stream may be filtered using the assembled hardware filter. The assembled hardware filter may use at least one filter coefficient, an inclusion mask, and an exclusion mask to filter messages. At least a portion of the filtered messages may be stored in memory via direct memory access transfers.

50 Claims, 8 Drawing Sheets

| Filter Group Name 410 | Bank 420 | | | | | | | |
|---|---|---|---|---|---|---|---|---|
| | 0 | 3 | 4 | 7 | 8 | 11 | 12 | 15 |
| 1B0 | x | | | | | | | |
| 1B1 | | x | | | | | | |
| 1B2 | | x | | | | | | |
| 1B3 | | x | | | | | | |
| 1B4 | | | x | | | | | |
| 1B5 | | | x | | | | | |
| 1B6 | | | | x | | | | |
| 1B7 | | | | x | | | | |
| 1B8 | | | | | x | | | |
| 1B9 | | | | | x | | | |
| 1B10 | | | | | x | | | |
| 1B11 | | | | | | x | | |
| 1B12 | | | | | | | x | |
| 1B13 | | | | | | | x | |
| 1B14 | | | | | | | | x |
| 1B15 | | | | | | | | x |

FIG. 4A

| Filter Group Name 410 | Bank 420 | | | | | | | |
|---|---|---|---|---|---|---|---|---|
| | 0 | 3 | 4 | 7 | 8 | 11 | 12 | 15 |
| 2B0 | x x | | | | | | | |
| 2B2 | | x x | | | | | | |
| 2B4 | | | x x | | | | | |
| 2B6 | | | | x x | | | | |
| 2B8 | | | | | x x | | | |
| 2B10 | | | | | | x x | | |
| 2B12 | | | | | | | x x | |
| 2B14 | | | | | | | | x x |
| 3B0 | x x x | | | | | | | |
| 3B5 | | x | x x x | | | | | |
| 3B8 | | | | | x x x | | | |
| 3B13 | | | | | | | x x x | |
| 4B0 | x x x x | | | | | | | |
| 4B4 | | | x x x x | | | | | |
| 4B8 | | | | | x x x x | | | |
| 4B12 | | | | | | | x x x x | |

METHOD AND SYSTEM FOR RECONFIGURABLE PATTERN FILTERING ENGINE

CROSS-REFERENCE TO RELATED APPLICATIONS/INCORPORATION BY REFERENCE

This application makes reference to:
U.S. patent application Ser. No. 11/015,445 filed Dec. 17, 2004; and
U.S. patent application Ser. No. 11/313,521 filed on even date herewith.

All of the above stated applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing data packets. More specifically, certain embodiments of the invention relate to a method and system for a reconfigurable pattern filtering engine.

BACKGROUND OF THE INVENTION

The introduction of broadband networks, access devices such as set-top boxes, and media such as DVD disks recorded with digitally compressed audio, video and data signals, for example, which utilize motion picture expert group (MPEG) compression protocols, may provide sound and picture quality that is virtually indistinguishable from the original material. One commonly used MPEG protocol is MPEG-2, which provides the necessary protocols and infrastructure necessary for transferring digitally compressed audio, video and data signals. A detailed description of the MPEG-2 standard is available in the ISO/IEC Standard 13818.

A file compressed, or encoded, via MPEG protocol may comprise a plurality of data streams. These data streams may include an elementary stream (ES), a packetized elementary stream (PES), a transport stream (TS) and a program specific information stream. A MPEG encoder typically creates an elementary stream from analog video or analog audio contents. Therefore, there may be at least two elementary streams generated from a program with audio and video content. The MPEG encoder may apply MPEG compression algorithms to the source content, resulting in individual elementary streams for each audio and video stream. The encoded MPEG data stream may be communicated to a subscriber who may use a set-top box, for example, to uncompress, or decode, the MPEG data stream for viewing on a TV. Factors such as a bit rate of the encoded stream, quality of the original source content, and encoder algorithm may determine the quality of the output signal.

In a typical MPEG data stream, the length of the individual elementary streams may be equivalent to the length of the program. The data in each elementary stream may be converted to a plurality of variable-length packets. These packets may be called the packetized elementary stream (PES). The packets in each PES may include a header that may be prepended to a payload. The header may include information pertaining to the encoding process required by the MPEG decoder to decompress and decode a received elementary stream. Each individual elementary stream may have a corresponding PES and encoded audio and video information may still reside in separate PESs.

The transport stream (TS) and program specific information stream may be formed by multiplexing a plurality of PES packets. The TS may include a plurality of additional packets that may contain tables, which may be necessary for de-multiplexing the TS. The tables may be collectively called program specific information (PSI). To maintain synchronization and timing, null packets may also be inserted to fill the intervals between information-bearing packets. Timing information for an associated program may be carried by specific packets. One type of timing information may be called the program clock reference (PCR). The PCR may be located in one of the optional fields of the header for the TS packet. During operation, the PCR may permit the decoder to synchronize its clock to the same frequency as that of the original encoder's clock frequency. TS packets may have a fixed length of 188 bytes, which may include a header having a minimum size of 4 bytes and a maximum payload of 184 bytes.

A typical set-top box for a cable or satellite subscriber may receive tens, if not hundreds, of channels of programming information. Each channel may have associated with it a plurality of data streams. Therefore, a set-top box may use a filtering system to be able to quickly determine which data stream each packet may be associated with. Some systems utilize sophisticated software programs to filter content for particular channels in a the plurality of data streams. As the number of channels in each data streams increases, the greater the complexity of these filters. Furthermore, as the number of data streams increases, even more sophisticated filters are required. As a result, the filters can overload the processor utilizing processing valuable processing bandwidth.

While the filters may be adequate for various applications when first released, new applications may require much larger filters than are presently available. As a result, the filters may only be able to filter a portion of the data, and additional processing resources may have to be dedicated to filter any unfiltered portions of messages. This may present an unwanted burden on the CPU.

Alternatively, the filter chip may be re-laid out with larger filters. However, this may not be a desirable since the cost of the re-layout may be very expensive. Additionally, the larger filters may increase the price of the filter chip.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a reconfigurable pattern filtering engine, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a reconfigurable pattern filtering engine. Aspects of the method may comprise assembling a hardware filter from a plurality of minimum length hardware filters. A length of the assembled hardware filter may vary in multiples of a length of one of the minimum length hardware filter. The assembled hardware filter and the minimum length hardware filters may be integrated within a single chip. Specific messages in the data stream may be filtered using the assembled hardware filter. The assembled hardware filter may use at least one filter coefficient, an inclusion mask, and an exclusion mask. At least a portion of the filtered message may be stored in memory via direct memory access (DMA) transfers.

Figure 1:
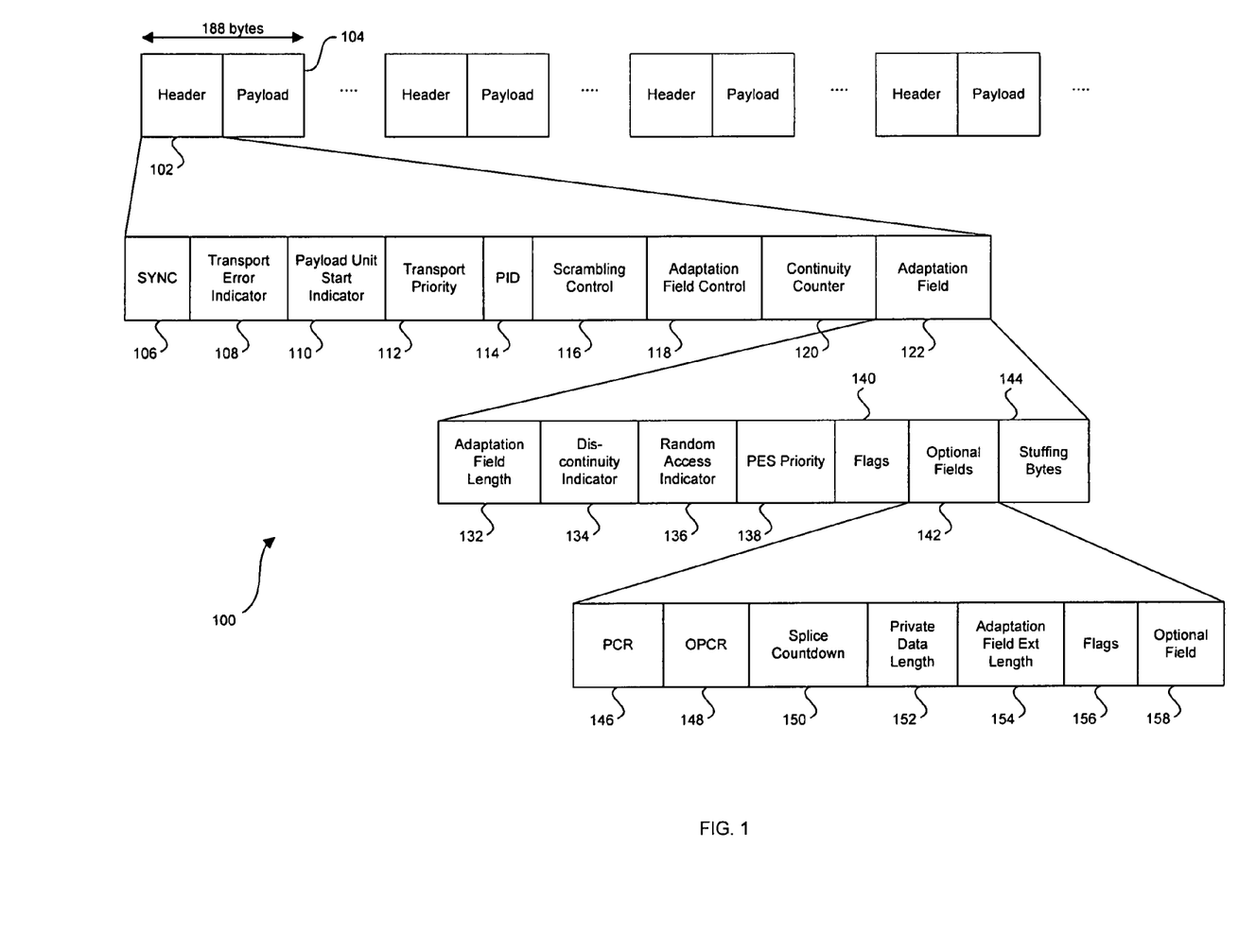
FIG. 1 is a diagram of the structure for an exemplary MPEG transport stream, which may be utilized in connection with an embodiment of the invention.

FIG. 1 is a diagram of the structure for an exemplary MPEG transport stream, which may be utilized in connection with an embodiment of the invention. Referring to FIG. 1, transport packets 100 may include a header 102 and a payload 104. The transport packets 100 may be a part of the transport stream (TS). The header 102 may be at least 4-bytes in length, and may include the following fields: synchronization (SYNC) 106, transport error indicator 108, payload unit start indicator 110, transport priority 112, packet ID (PID) 114, transport scrambling control 116, adaptation field control 118, continuity counter 120, and an optional adaptation field 122. The adaptation field, if present, may be a variable length field. The adaptation field 122 may further include the following fields: adaptation field length 132, discontinuity indicator 134, random access indicator 136, PES priority 138, flags 140, optional fields 142, and stuffing bytes 144. The optional fields 142 may further include the following: program clock reference (PCR) 146, OPCR 148, a splice countdown 150, private data length 152, adaptation field extension length 154, flags 156 and optional field 158. The payload 104 may comprise portions of data from the PES.

The SYNC byte 106 may be used to delineate the beginning and ending of TS packet 100. The transport$_{error}$ indicator 108 may indicate when there is an error in a packet or block. This may be particularly useful for error block testing. PID 114 may be a unique identifier that may identify every video and audio streams. The PID 114 may be used for identifying a channel and may include any information required for locating, identifying and reconstructing programs. Some PIDs may be reserved for specific uses by the MPEG protocol. The PID values may be stored in program specific information (PSI) tables. The PSI tables may be used to de-multiplex the TS. In order to ensure that all the audio, video and data for a program are properly decoded, it may be critical to ensure that the PIDs are correctly assigned and that the PSI tables correspond with their associated audio and video streams.

The stuffing bytes 144 may be used when the payload has a length of less than 184 bytes. The stuffing bytes 144 may be inserted to bring the packet size to the required 188-byte length. The PCR 146 may comprise 42 bits, 9 bits of which may be incremented at 27 MHz and 33 bits that may be incremented at 90 kHz upon rollover of the 9 bits. The bits in the PCR 146 may provide program clock recovery information that may be utilized for synchronization. The PCR 146 may be used to provide a clock recovery mechanism for MPEG programs. A 27 MHz system time clock (STC) signal may typically be used for encoding MPEG signals. Decoding of the signal requires a clock that may be locked to the encoder's STC of 27 MHz. Notably, the PCR 146 may be utilized by the decoder to regenerate a local clock signal that is locked to the STC. Whenever a program is placed in the transport stream, a 27 MHz time stamp may be inserted into the PCR 146. When the signal is received by a decoder, the decoder may compare the value in the PCR 146 with the frequency of its local voltage controlled oscillator (VCO) and adjust the VCO to ensure that the VCO is locked to the frequency specified by the PCR 146. To ensure accuracy, the PCR 146 may be updated with the STC every about 100 ms.

The continuity counter (CC) 120 may be used to determine when packets are lost or repeated. It may include a 4-bit field, which may be repeatedly incremented from zero to 15 for each PID. Discontinuity counter 134 may permit a decoder to handle discontinuities in the transport stream. Discontinuity counter 134 may indicate a time base such as the PCR 146 and continuity counter 120 discontinuities. Random access indicator 136 may be configured to indicate whether the next PES packet in the PID stream contains a video-sequence header or the first byte of an audio frame. Splice countdown 150 may be configured to indicate the number packets of the same PID number to a splice point occurring at the start of PES packets.

Two or more MPEG transport streams (TS) may be multiplexed to form a multi-program TS. In a case where the TS may include a single MPEG TS, the output of the multiplexer may be called a single program TS (SPTS). Furthermore, a number of SPTSs may be multiplexed to create a multi-program TS. In some cases, the program may include one or more ESs that may have a similar time reference. This may occur, for example, in a movie that has video and its corresponding audio content.

The PSI may include a set of tables that may be part of a TS. The tables in the PSI may be required while de-multiplexing the TS and for matching PIDs to their corresponding programs. Once the PIDs are matched to their corresponding programs, the TS may be decoded by assembling and decompressing program contents. Typically, in order to determine which audio and video PIDs contain the corresponding content for a particular program, a program map table (PMT) may be decoded. Each program may have its own PMT bearing a unique PID value. The PAT may be decoded in order to determine which PID contains the desired program's PMT. The PAT may function as the master PSI table with PID value that may always be equal to zero (0). In a case where the PAT cannot be found and decoded in the TS, no programs may be available for presentation.

The PSI table may be refreshed periodically at a rate that is fast enough to allow a set-top box to go through program recovery and decompression processes. This may be necessary to ensure real-time user interaction. The PSI may also be used to determine the accuracy and consistency of PSI contents. Notwithstanding, during programs changes or modification of multiplexer provisioning, there may be packets which have a PID value present in the TS, but have no corresponding reference in the PSI. Additionally, the PSI may have references to one or more packets in the PID that are not present in the TS.

In MPEG compliant systems, audio/video services may be carried using some or all of the 188 bytes of the transport packets 100. The transport packets 100 may have one or more stuffing bytes 144 to bring the transport packet size to 188 bytes. Multiple services may be differentiated using a packet identifier (PID) contained in a packet header called the transport packet header. Transport packets from various services may be multiplexed and transmitted on the same physical medium. Exemplary media may include, copper, coaxial cable, wireless, optical and any combination thereof. On the receiver side transport packets may be de-multiplexed and data may be separated for each service. For example, audio packets may be separately de-multiplexed from video packets.

Transport packets 100 may include a 4-byte header 102, which may include an optional adaptation field 122, and a packet payload 104. The packet payload 104 may not be altered by multiplexing or transmitting equipment, except during processing which may include data encryption and decryption. In general, encryption may be done once within a typical MPEG processing system. Notwithstanding, some fields of the adaptation field 122 may be changed by multiplexing, for example. Typically, packet order within a PID channel may be maintained from a MPEG encoder to a MPEG decoder, but packet order among multiple PID streams may not be guaranteed during transmission by any transmitting equipment. In cases where co-relation of packets from different PIDs may be required, packet position in a stream may not be utilized since packet order among multiple PID channels may be altered.

Figure 2A:
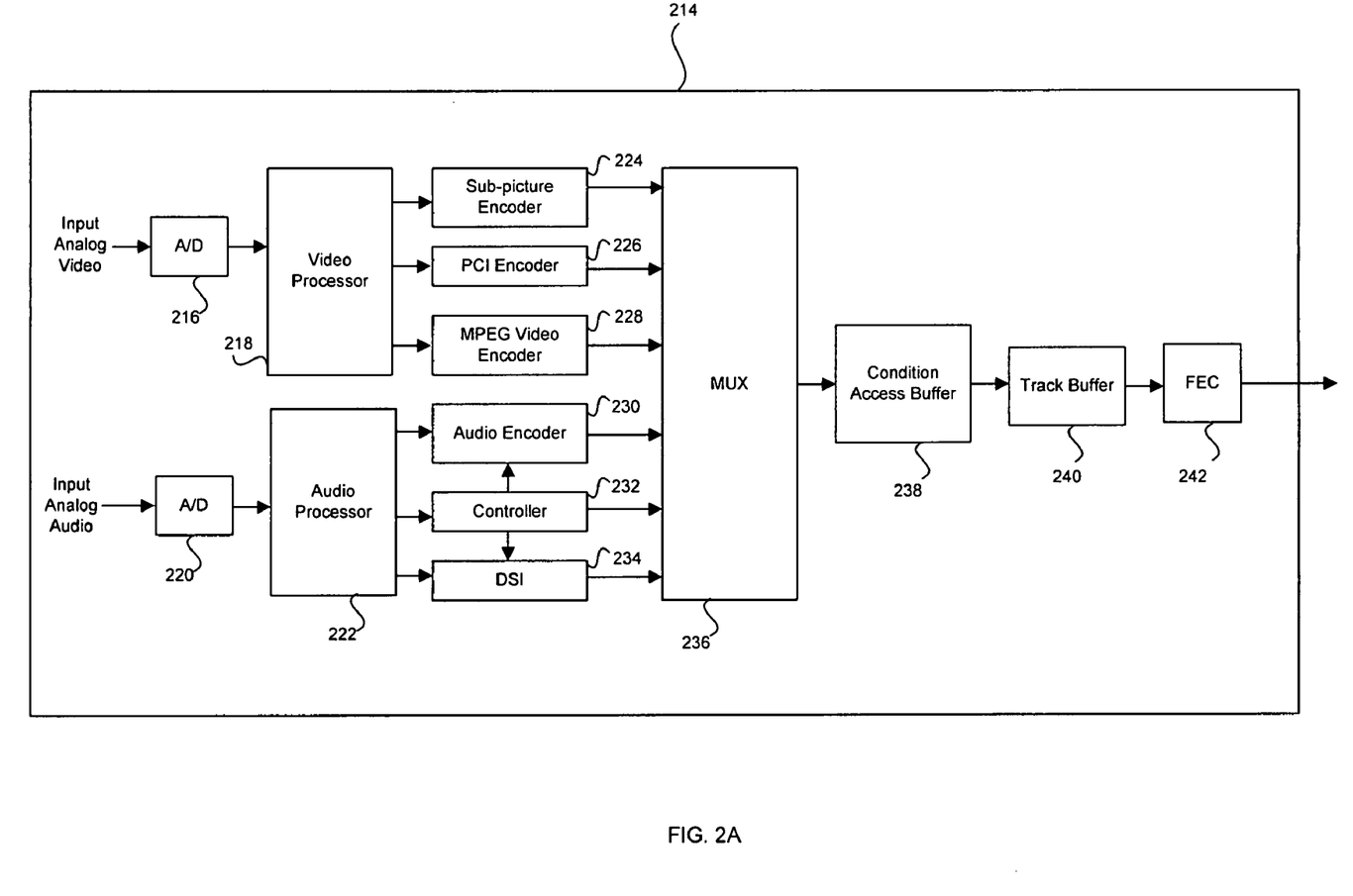
FIG. 2A is a block diagram of an exemplary MPEG encoding system, which may be utilized in connection with an embodiment of the invention.

FIG. 2A is a block diagram of an exemplary MPEG encoding system, which may be utilized in connection with an embodiment of the invention. Referring to FIG. 2A, the MPEG encoding system 214 may encode analog audio and analog video input signals to digital audio and digital video signals, respectively. The analog video input signal may be converted to digital format by A/D converter 216. An output signal from the A/D converter 216 may be communicated to video processor 218 for processing. After the video processor 218 processes the signal, the output signal generated from the video processor 218 may be sent to a sub-picture encoder 224 for processing. A presentation control information (PCI) encoder 226 may be configured to encode PCI data for the video signal processed by video processor 218. The output signal generated from the video processor 218 may also be received and processed by a MPEG video encoder 228 which may be configured to format the video signal in MPEG format.

An analog input audio signal may be converted to digital format by A/D converter 220. An output signal from the A/D converter 220 may be communicated to audio processor 222 for processing. After the audio processor 222 processes the signal, the output signal generated from the audio processor 222 may be sent to an audio encoder 230 to be encoded in a suitable format. A data search information (DSI) encoder 234 may be configured to encode indexing and search data for the audio signal processed by audio processor 222. The outputs from the sub-picture encoder 224, PCI encoder 226, MPEG video encoder 228, audio encoder 230 and DSI encoder 234 may be multiplexed into a single data stream, by multiplexer 236. A controller 232 may be configured to control the operations of audio encoder 230, DSI encoder 234 and multiplexer (MUX) 236. The output of the MUX 236 may include a single steam, which may contain various kinds of PES. The PES may include, audio, video, PCI, DSI and sub-picture information.

The MPEG encoding system 214 may also include a conditional access buffer 238 that may be configured to control propagation of the packets through the MUX 236. A track buffer 240 may be used to buffer and assemble data packets for further processing. Finally, the assembled packets may be encoded with a forward error correction algorithm within a forward error correction block (FEC) 242 for transmission over a channel. The output of the FEC block 242 may be a MPEG formatted digital audio/video signal.

Figure 2B:
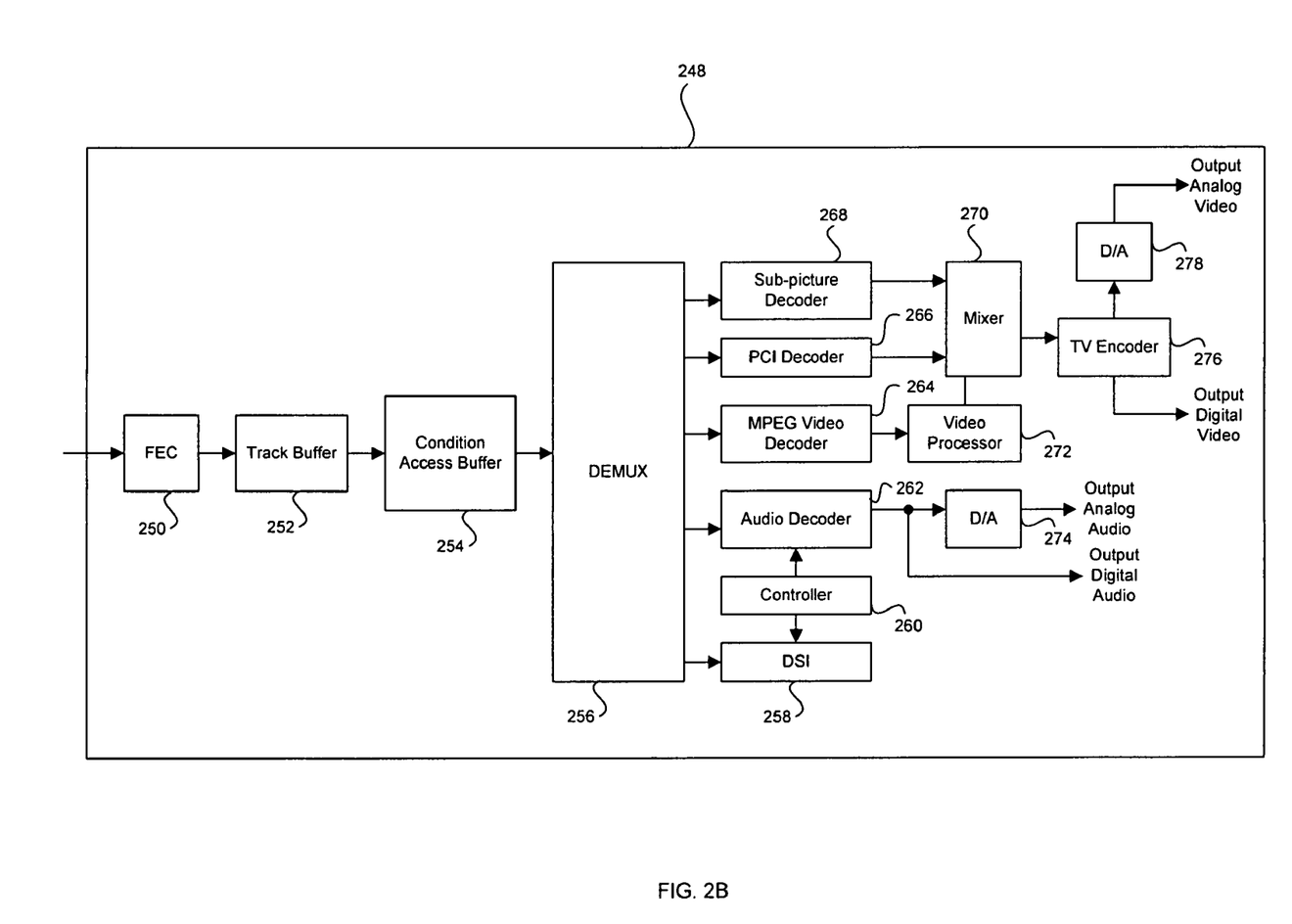
FIG. 2B is a block diagram of an exemplary MPEG decoding system, which may be utilized in connection with an embodiment of the invention.

FIG. 2B is a block diagram of an exemplary MPEG decoding system, which may be utilized in connection with an embodiment of the invention. The MPEG decoding system 248 may be, for example, a set-top box. Referring to FIG. 2B, MPEG decoding system 248 may include a forward error correction processing block 250 and a track buffer 252. The track buffer 252 may be used to buffer and assemble data packets for further processing. The packets may be processed by a conditional access circuit 254 that may be configured to control propagation of the packets through de-multiplexer (DEMUX) 256 and into respective video and audio processing paths. The output of the DEMUX 256 may include various kinds of packetized elementary streams (PES), including audio, video, presentation control information (PCI), sub-picture information, and data search information (DSI) streams. The de-multiplexed PCI in the PES may be buffered prior to being decoded by PCI decoder 266.

The sub-picture information in the PES may be buffered and decoded by sub-picture decoder 268. The de-multiplexed video stream in the PES may be decoded by MPEG video decoder 264. Video processor 272 may be configured to process the output from the MPEG video decoder 264. Video processor 272 may be a microprocessor or an integrated circuit (IC). Subsequent to processing of the MPEG video, mixer 270 may combine the outputs of the PCI decoder 266, the video processor 264 and the sub-picture decoder 268 to form a composite video signal. The output of mixer 270 may thereafter be encoded in a conventional television signal format such as PAL, SECAM, or NTSC by the TV encoder 276. The output of the TV encoder 276 may be a digital video signal. However, D/A converter 278 may convert this digital video output signal to an analog video output signal.

The audio portion of the PES may be buffered and decoded by audio decoder 262. The output of the audio decoder 262 may be a digital audio signal. The audio D/A 274 may process digital audio received from the audio decoder 262 and produce an analog audio output signal. Audio decoder 262 may include a frame buffer sufficient for temporarily storing audio frames prior to decoding. Controller 260 may control the operation of audio decoder 262 and DSI 258. Controller 260 may be configured to utilize DMA to access to data in track buffer 252 or any other associated memory (not shown).

Program specific information (PSI) comprises MPEG data identifying specific portions of a transport stream belonging to a particular program. Program specific information may be communicated via one or more PSI tables. These PSI tables may comprise a program association table (PAT), a program map table (PMT), a conditional access table (CAT) and a network information table (NIT). The conditional access table may be utilized to identify those PID values in the transport packets that bear entitlement management messages (EMMs). The network information table may be utilized to map information such as channel frequencies and transponder numbers.

While the program association table and program map table may be required by MPEG-2, the conditional access table and the network information table may be optional tables. Entry to the program specific information (PSI) tables may be provided by the program association table, the latter of which is carried in packets bearing a PID of 0 (packet ID=0). Each program may be assigned a program number and for each program number that is assigned, the program association table lists the PID associated with packets containing the corresponding program's program map table (PMT). The PMT generally comprises a listing of the PIDs for packets having various components for a particular program such as audio, video, and program clock reference (PCR). The program association table may also comprise program IDs for one or more network information tables. The NIT may be utilized for identification purposes and may be utilized to map information such as transponder numbers and channel frequencies for programs. Packets bearing a PID of 1 (packet ID=1) may be utilized to carry conditional access tables. The PIDs for entitlement management messages (EMMs), may comprise authorization level information, which may be stored in the conditional access tables located in conditional access buffers.

During decoding, a MPEG decoder may be adapted to read a program access table in order to locate a desired program. Once the desired program is located in the program access table, packets bearing the desired program map table may be demultiplexed. The program map table may then be read to identify those packets that bear the program IDs specified in the program map table. Once the program IDs are read, the corresponding packets may then be demultiplexed in order to generate the associated elemental streams.

Figure 3:
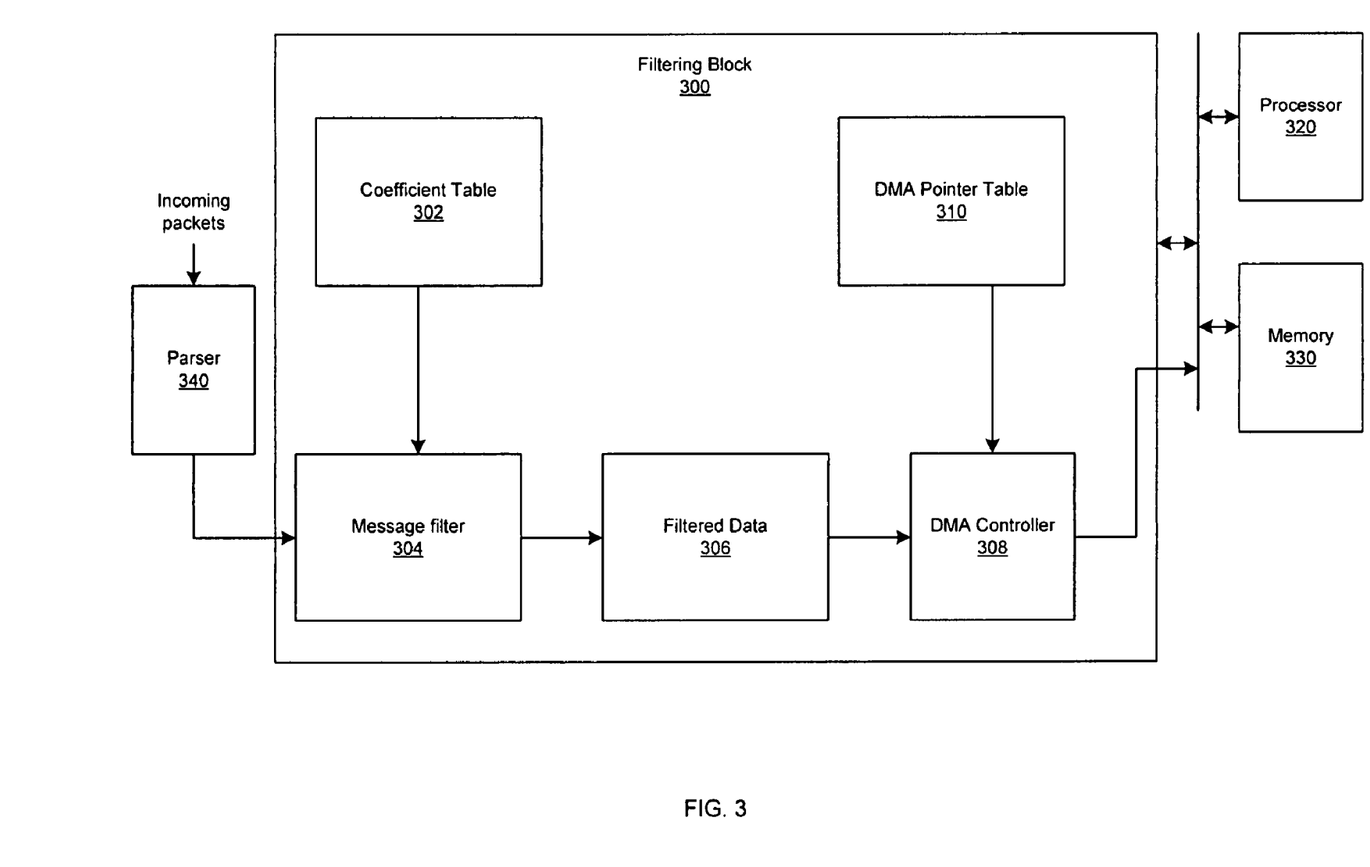
FIG. 3 is a block diagram of an exemplary filtering block, in accordance with an embodiment of the invention.

FIG. 3 is a block diagram of an exemplary filtering block, in accordance with an embodiment of the invention. Referring to FIG. 3, there is shown a filtering block 300, a processor 320, a memory block 330, and a parser block 340. The filtering block 300 may comprise a coefficient table block 302, a message filter block 304, a filtered data block 306, a DMA controller block 308, and a DMA pointer table block 310.

The coefficient table block 302 may comprise suitable logic, circuitry, and/or code that may store a coefficient, an inclusion mask, and an exclusion mask for hardware filters that may be configured to certain lengths in the message filter block 304. The coefficient may be a bit pattern that may be used by a hardware filter to compare with incoming data, which may be referred to as messages. The inclusion mask and exclusion mask may each be used to mask bits of the coefficient for different compare operations of the hardware filter. The coefficients, inclusion masks, and the exclusions masks may be written to the coefficient table 302 by, for example, the processor 320.

The coefficient, the inclusion mask, and the exclusion mask may be, for example, the same number of bits for each hardware filter in the message filter block 304. However, since the hardware filters in the message filter block 304 may be configurable, a length of one hardware filter may be different than the length of another hardware filter. Accordingly, the number of bits for the coefficient, an inclusion mask, and an exclusion mask may be different for one hardware filter than for another hardware filter. In some embodiments of the invention, the coefficients, the inclusion masks, and the exclusion masks may be stored in a table in memory. Other exemplary embodiments of the invention may store the coefficients, the inclusion masks, and the exclusion masks in a plurality of registers.

The message filter block 304 may comprise logic, circuitry, and/or code that may be adapted to form hardware filters of variable lengths for filtering, for example, PSI and/or PES messages. In one embodiment of the invention, a hardware filter may be expanded in increments of 2 bytes. The lengths of the hardware filters may be configured by, for example, the processor 320. Accordingly, the hardware filters may be reconfigured to be different lengths for different applications. A hardware filter in the message filter block 304 may compare bits of a message with bits that may result from masking the coefficient with the inclusion mask or the exclusion mask. The inclusion mask may be used for a positive comparison, and the exclusion mask may be used for a negative comparison. A message may be considered to match if both the positive comparison at a hardware filter and the negative comparison at that hardware filter produce a match. A hardware filter may match data from a fixed number of bytes of offset, or from a variable number of bytes of offset, from the start of a message. The U.S. application Ser. No. 11/313,531, filed on even date herewith, provides a detailed description of one or more embodiments of a variable offset that may be used, and is hereby incorporated herein by reference in its entirety.

Positive comparison may match if all bits of the coefficient that are not masked by the inclusion mask matches corresponding bits in the message. An asserted bit in the inclusion mask may mask a corresponding bit of the coefficient. This may indicate that the corresponding bit need not be compared. If the inclusion mask is such that no bits are to be compared, then all messages will match. Negative comparison may match if any bit of the coefficient that is not masked by the exclusion mask is not the same as a corresponding bit in the message. An asserted bit in the exclusion mask may mask a corresponding bit of the coefficient. This may indicate that the corresponding bit need not be compared. If the exclusion mask is such that no bits are to be compared, then all messages will match.

The filtered data block 306 may comprise memory and/or registers that may be used to store filtered data from the message filter block 304. The DMA controller block 308 may be a standardized DMA controller, which may be utilized to control direct memory transfer of filtered data to a memory such as the memory block 330. The DMA pointer table block 310 may comprise memory and/or registers that may store information needed for DMA transfers of the filtered data. The DMA information may comprise, for example, start address of the memory block 330 to transfer the data to, and the number of bytes of data to transfer. The DMA information may be written by, for example, the processor 320. The PSI parser block 340 may comprise suitable logic, circuitry and/or code that may enable parsing of an incoming transport stream. Accordingly, various portions of an incoming data stream may be parsed and only the required portions of the parsed data stream may be filtered by the filtering block 300.

In operation, the parser block 340 may receive incoming data packets for a data stream, and may parse the data packets. The resulting parsed messages may comprise information needed for decoding data for the data stream. The message filter block 304 may use for example, up to 32 hardware filters for each PID channel. The PID associated with the message may determine the hardware filters that may be used to filter the message. If any of the hardware filters associated with the PID matches the message with the filter coefficient, that message may be stored in the filtered data block 306.

For example, two hardware filters associated with a specific PID may filter a message with that PID. One hardware filter may be associated with video data stream for that channel and another hardware filter may be associated with audio data stream for that channel. If the audio data filter matches the message, the message may be saved. Similarly, if the video data filter matches the message, the message may also be saved. If any filter fails to match a message, that filter may ignore that message.

The filtering may comprise positive comparison and negative comparison of the data packet from the parser block 340. The comparisons may use the corresponding coefficient, the inclusion mask, and the exclusion mask from the coefficient table 302. If a message matches the positive comparison and the negative comparison, then the message may be communicated to the filtered data block 306. The messages in the filtered data block 306 may be DMA transferred to the memory block 330 by the DMA controller block 308. The DMA controller block 308 may use appropriate DMA information in the DMA pointer table block 310. Accordingly, each hardware filter in the message filter block 304 may, for example, select specific messages for a specific channel.

The length of each hardware filter may be configured by, for example, the processor 320. An advantage of configurable hardware filters may be that hardware components in the message filter block 304 may be more efficiently used. Another advantage may be, for example, that the processor 320 may not need to filter messages as much as with hardware filters that are not configurable.

For example, some filter block designs may comprise a number of filters of pre-set length, for example, 32 filters where each filter is 8 bytes in length. However, this may lead to inefficiencies. For example, if an application needs 16 filters where each filter is 12 bytes in length, the filter block design with 32 filters and each filter 8 bytes in length may not be able to adequately filter the data. Accordingly, a processor may have to filter the data using software algorithms. Additionally, since only 16 of the 32 filters may be used, the other 16 filters may be idle.

Another application may require 64 filters where each filter may be 4 bytes in length. In this case, all 32 filters may be used, however, only four bytes of the eight bytes available in each filter may be used. Additionally, since there may only be 32 filters available, a processor may have to filter the remaining unfiltered data.

In accordance with an embodiment of the invention, the message filter block 304 may comprise, for example, minimum length hardware filters of 4-byte length. For the case where 16 filters of length 12 bytes may be needed, the minimum length filters may be configured such that they may be joined together to form 16 filters of length 12 bytes. For the case where 64 filters of length 4 bytes may be needed, a minimum length filter may be configured as an independent filter of 4 bytes. In this manner, the minimum length filters may be used more flexibly, and more efficiently, than a number of larger filters that may not be reconfigured. The smaller the size of the minimum length filter, the greater the flexibility of the assembled filter. However, as the size of the minimum length filter decreases, more information may be required to assemble or configure a filter from the minimum length filters.

Some embodiments of the invention may allow assembling of minimum length filters whether they are contiguous to each other or not. Other embodiments of the invention may only allow assembling of filters where the minimum length filters are contiguous to each other. This may be a design decision that balances a more flexible filter with more complex circuitry that allows assembly of filters from non-contiguous minimum length filters against a less flexible with less complex circuitry that only allows assembly of filters from contiguous minimum length filters. Additionally, although the exemplary minimum length filter is described as having a length of 4 bytes, the invention need not be so limited. The minimum length filter may have a length that may vary depending on design. Furthermore, although the coefficient table block 302 is described as storing the coefficients, the inclusion masks, and the exclusion masks, the invention need not be so limited. For example, the coefficient table block 302 may be a part of the message filter block 304, or any of the coefficients, inclusion masks, or the exclusion masks may be stored in the message filter block 304.

Figure 4A:
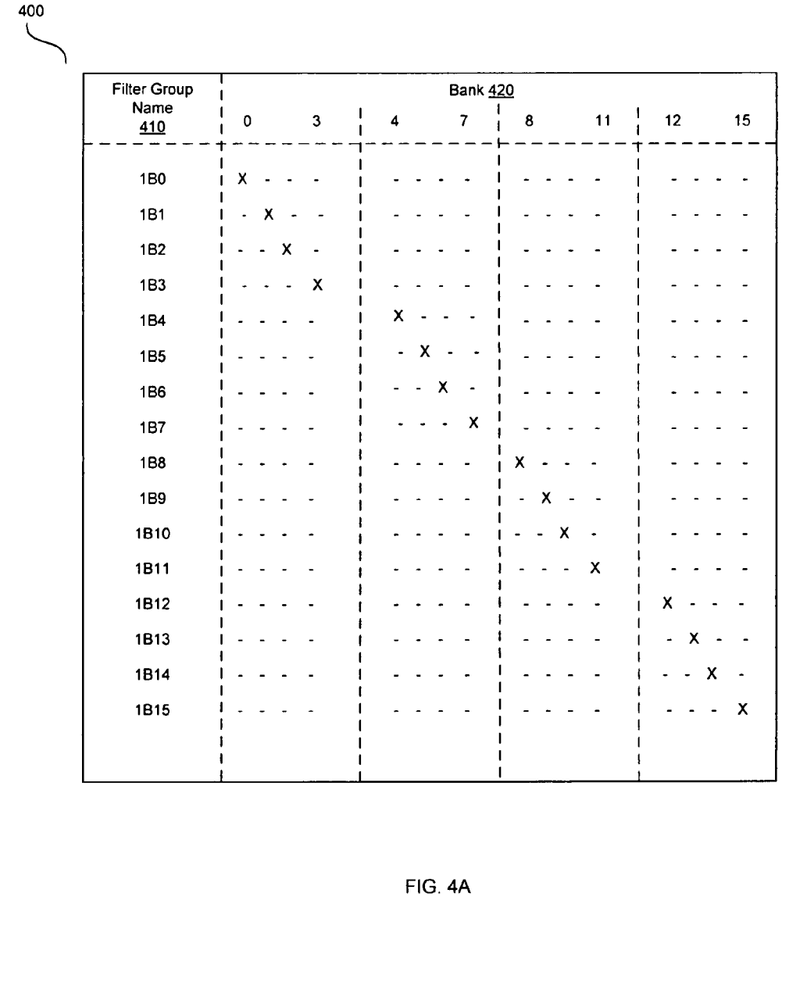
FIG. 4A is a table illustrating exemplary assembling of reconfigurable filters, in accordance with an embodiment of the invention.

FIG. 4A is a table illustrating exemplary assembling of reconfigurable filters, in accordance with an embodiment of the invention. Referring to FIG. 4A, there is shown a table 400 that comprises a plurality of rows that may correspond to a plurality of filters. In this exemplary configuration, each PID channel may be assigned up to 32 filters, where up to 16 filters of 4 bytes in length may be assembled together to form each filter. Accordingly, each PID channel may be assigned up to 32 filters, where each filter may be up to 64 bytes in length. This embodiment of the invention may require, for example, that filters larger than 4 bytes in length be formed by assembling contiguous banks of 4-byte filters.

Each filter may have a corresponding filter group name 410 and associated banks 420. For example, a filter may have a filter group name 410 of 1B0. The first number, '1' in this case, in the filter group name 410 may indicate the number of banks of 4-byte filters that may be assembled together to form the filter. The second number, '0' in this case, may indicate the starting bank number of the banks 420 of the 4-byte filters that are assembled together. Accordingly, the filter group name 410 of 1B0 may indicate that the filter comprises a 4-byte filter at bank 0. Similarly, the remaining rows in FIG. 4A may indicate that each filter is a 4-byte filter utilizing the 4-byte filter at each of the banks 1, 2, . . . , 15.

Figure 4B:
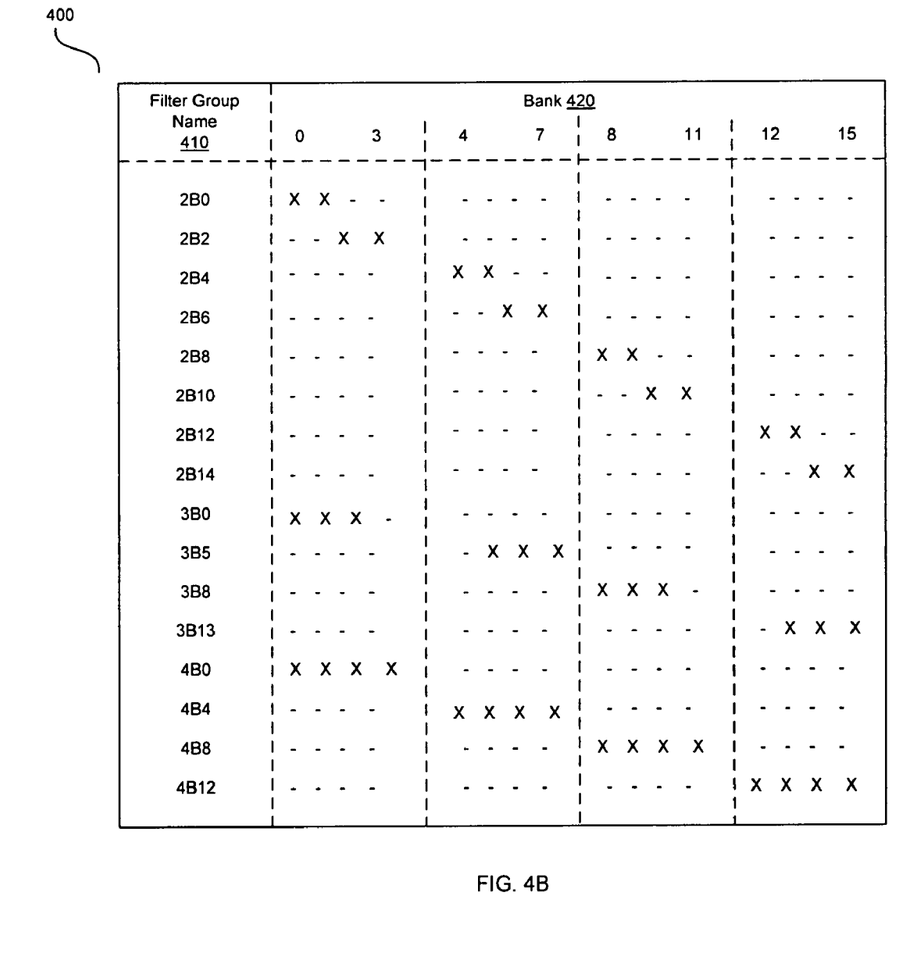
FIG. 4B is a table illustrating exemplary assembling of reconfigurable filters, in accordance with an embodiment of the invention.

FIG. 4B is a table illustrating exemplary assembling of reconfigurable filters, in accordance with an embodiment of the invention. Referring to FIG. 4B, there is shown the table 400 that further comprises a plurality of rows that may correspond to a plurality of filters. In this exemplary configuration, each PID channel may be assigned up to 32 filters where up to 16 filters of length 4 bytes may be assembled together. Accordingly, each PID channel may be assigned up to 32 filters, where each filter may be up to 64 bytes in length. This embodiment of the invention may require, for example, that filters larger than 4 bytes in length be formed by assembling contiguous banks of 4-byte filters.

The first row may be associated with the filter group name 410 of 2B0. Accordingly, the filter group name 410 of 2B0 may correspond to an 8-byte filter comprising two contiguous banks of 4-byte filters starting at bank 0, or banks 0 and 1. The second row may be associated with a filter group name 410 of 2B2. Accordingly, the filter group name 420 of 2B2 may correspond to an 8-byte filter comprising two contiguous banks of 4-byte filters starting at bank 2. Similarly, the rows with filter group names 420 of 2B4, 2B6, . . . , 2B14 may correspond to 8-byte filters comprising two contiguous banks of 4-byte filters starting at bank 4, bank 6, . . . , bank 14, respectively.

The rows associated with the filter group names 410 of 3B0, 3B5, 3B8, and 3B13 may correspond to 12-byte filters comprising three contiguous banks of 4-byte filters starting at bank 0, bank 5, bank 8, and bank 13, respectively. The rows associated with the filter group names 410 of 4B0, 4B4, 4B8, and 4B12 may correspond to 16-byte filters comprising four contiguous banks of 4-byte filters starting at bank 0, bank 4, bank 8, and bank 12, respectively.

Figure 4C:
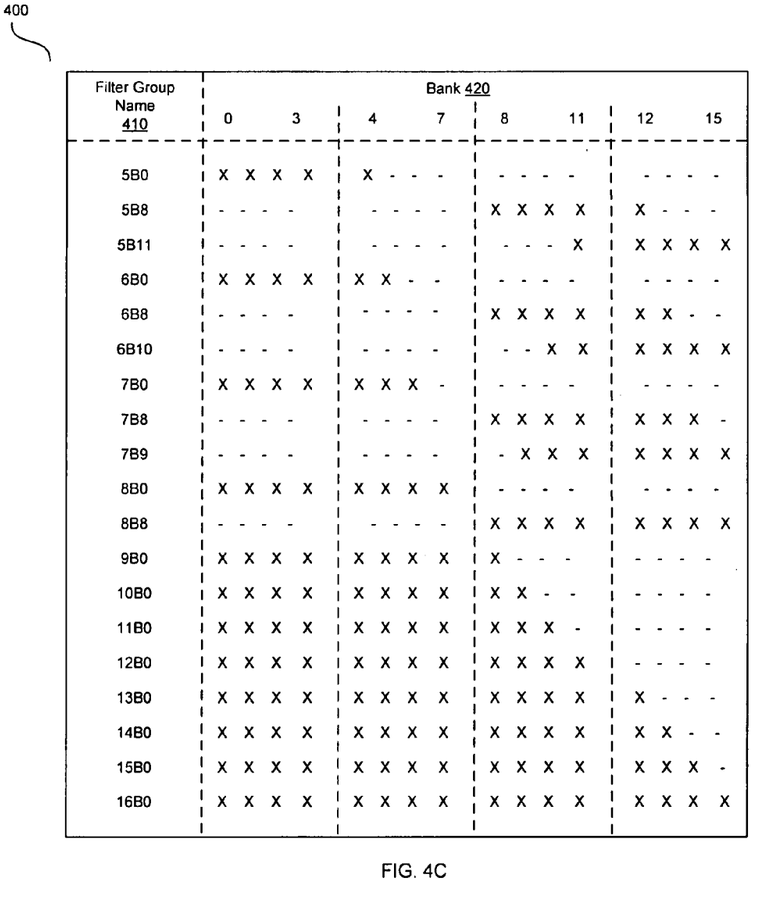
FIG. 4C is a table illustrating exemplary assembling of reconfigurable filters, in accordance with an embodiment of the invention.

FIG. 4C is a table illustrating exemplary assembling of reconfigurable filters, in accordance with an embodiment of the invention. Referring to FIG. 4C, there is shown the table 400 that further comprises a plurality of rows that may correspond to a plurality of filters. In this exemplary configuration, each PID channel may be assigned up to 32 filters where up to 16 filters of length 4 bytes may be assembled together. Accordingly, each PID channel may be assigned up to 32 filters, where each filter may be up to 64 bytes in length. This embodiment of the invention may require, for example, that filters larger than 4 bytes in length be formed by assembling contiguous banks of 4-byte filters.

The rows associated with the filter group names 410 of 5B0, 5B8, and 5B11 may correspond to 20-byte filters comprising five contiguous banks of 4-byte filters starting at bank 0, bank 8, and bank 11, respectively. The rows associated with the filter group names 410 of 6B0, 6B8, and 6B10 may correspond to 24-byte filters comprising six contiguous banks of 4-byte filters starting at bank 0, bank 8, and bank 10, respectively.

The rows associated with the filter group names 410 of 7B0, 7B8, and 7B9 may correspond to 28-byte filters comprising seven contiguous banks of 4-byte filters starting at bank 0, bank 8, and bank 9, respectively. The rows associated with the filter group names 410 of 8B0 and 8B8 may correspond to 32-byte filters comprising eight contiguous banks of 4-byte filters starting at bank 0 and bank 8, respectively.

The rows associated with the filter group names 410 of 9B0, 10B0, 11B0, and 12B0 may correspond to filters of length 36 bytes, 40 bytes, 44 bytes, and 48 bytes, respectively. These filters may comprise nine, ten, eleven, and twelve, respectively, contiguous banks of 4-byte filters starting at bank 0. The rows associated with the filter group names 410 of 13B0, 14B0, 15B0, and 16B0 may correspond to filters of length 52 bytes, 56 bytes, 60 bytes, and 64 bytes, respectively. These filters may comprise thirteen, fourteen, fifteen, and sixteen, respectively, contiguous banks of 4-byte filters starting at bank 0.

Figure 5:
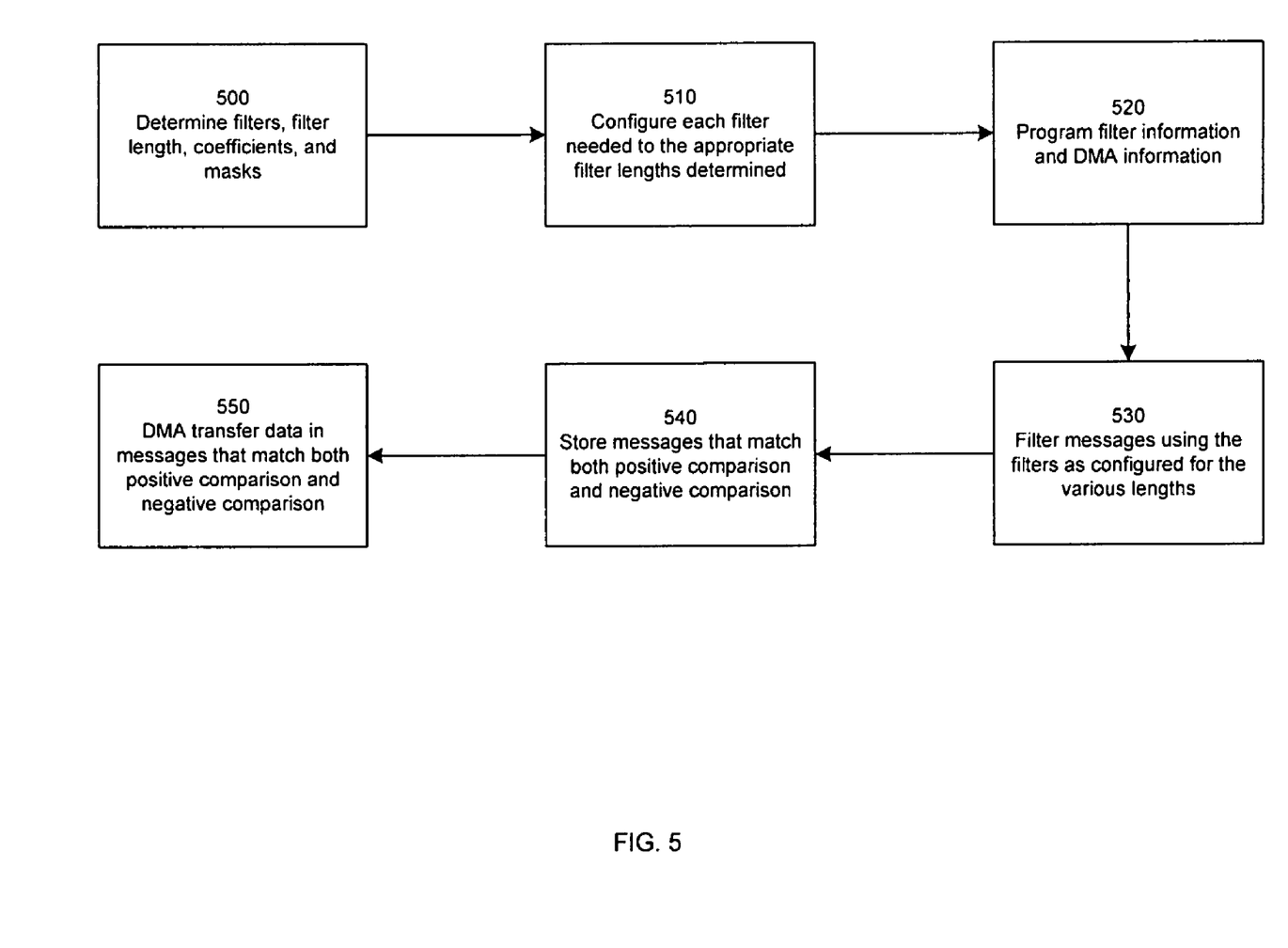
FIG. 5 is a flow chart illustrating exemplary steps for utilizing reconfigurable filters, in accordance with an embodiment of the invention.

FIG. 5 is a flow chart illustrating exemplary steps for utilizing reconfigurable filters, in accordance with an embodiment of the invention. In step 500, the number of filters needed and corresponding filter coefficients and masks may be determined. In step 510, filters may be assembled for the desired length. In step 520, the filter information and DMA information may be programmed for each filter. In step 530, the messages may be filtered. In step 540, the filtered messages may be output. In step 550, the filtered messages may be DMA transferred to memory.

Referring to FIG. 5, in step 500, a processor, for example, the processor 320, may determine the number of filters, and the lengths of the filters, desired for an application. The information corresponding to an application may be, for example, stored in the memory block 330 as part of system information. The processor 320 may also determine the coefficients for the filters and inclusion and exclusions masks for use with the coefficients. All filters may be allocated based on the PID of a channel stream. Accordingly, packets from each channel stream, which may comprise audio stream and video stream, for example, may have a PID of a particular channel. The packets may be communicated to all filters that are allocated to that PID. In step 510, the processor 320 may assemble the 4-byte filters in the filter block 300 for the desired length of each filter. For example, if a 40-byte filter is desired, the 4-byte filters in the banks 0 to 9 may be joined together to form the 40-byte filter. Each configured filter may be allocated to a PID.

In step 520, filter information and DMA information corresponding to each filter may be programmed. The filter information may comprise the coefficient, the inclusion mask, and an exclusion mask. The filter information may be stored in the coefficient table 302 for use by the message filter 304. The coefficient and the masks may be used to identify various streams of a channel. For example, one filter may be utilized to match all video stream messages of a channel, and another filter may be utilized to match all audio stream messages of that same channel.

The DMA information may comprise destination addresses to which data may be DMA transferred. The destination address may be stored in the DMA pointer table block 310. An embodiment of the invention may also store the number of bytes to be DMA transferred in, for example, the DMA controller block 308. This information may be communicated by, for example, the message filter 304 after it matches a message. Accordingly, the data in the messages corresponding to a video stream for a PID channel may be stored together in the memory block 330.

In step 530, the message filter 304 may filter messages from the parser 340. The messages may be filtered based on the coefficient, the inclusion mask, and the exclusion mask from the coefficient table block 302. The coefficient may be a pattern of bits, where the number of bits may be the same as the number of bits in the filter. The inclusion mask may be a mask with the same number of bits as the coefficient, where each asserted bit may indicate a bit that need not be compared with a corresponding bit in the message. The inclusion mask may be used for a positive comparison where a match may require that each bit on the coefficient that is compared equals the corresponding bit in the message. If the inclusion mask is configured so that no bits are compared, then the positive comparison is considered to be a match for all messages.

The exclusion mask may be a mask with the same number of bits as the coefficient, where each asserted bit may indicate a bit that need not be compared with a corresponding bit in the message. The exclusion mask may be used for a negative comparison where a match may require that at least one bit on the coefficient that is compared is not equal the corresponding bit in the message. If the exclusion mask is configured so that no bits are compared, then the negative comparison is considered to be a match for all messages.

In step 540, if the message matches the positive comparison and the negative comparison, the message may be considered to be a match by the filter. Accordingly, the message may be stored in the filtered data block 306. If a filter does not match a message, then that message may be ignored by that filter. In step 550, the DMA controller block 308 may DMA transfer the data in the filtered data block 306 to the memory block 330. Accordingly, for example, all messages that correspond to a stream of a PID channel may be stored together. For example, all messages of a video stream for a specific PID channel may be stored together.

Another embodiment of the invention may provide a machine-readable storage, having stored thereon, a computer program having at least one code section executable by a machine, thereby causing the machine to perform the steps as described above for reconfigurable pattern filtering engine.

In accordance with an embodiment of the invention, aspects of an exemplary system may comprise a filtering block 300 that enables assembling of a hardware filter from a plurality of minimum length hardware filter in the message filter block 304. The filtering block 300 may be on a chip. The filtering block 300 may enable filtering of specific messages in the data stream using the configured hardware filter in the message filter block 304. The assembled hardware filter may comprise a plurality of the minimum length hardware filters that may be contiguously arranged and/or non-contiguously arranged. A length of the assembled hardware filter may vary in multiples of a length of one of the minimum length hardware filter. In this regard, if the minimum length filter has a length L, then the length of the assembled hardware filter is nL, where n is an integer greater than or equal to 2, since a plurality of the minimum length hardware filters are utilized. For example, a length of the assembled hardware filter may be 2L, 3L, . . . , and so on. Additionally, the minimum length filter can be used by itself to form a filter of length L.

The assembled hardware filter in the message filter block 304 may use at least one filter coefficient, and an inclusion mask and an exclusion mask for each configured hardware filter in the message filter block 304. The filter coefficient, the inclusion mask, and the exclusion mask may be stored, for example, in the coefficient table block 302. The coefficient table block 302 may use memory, for example, RAM, and/or registers for storing the filter coefficients, the inclusion masks, and the exclusion masks. The filtered messages may be stored in memory, for example, the memory 330, via DMA transfers. The DMA transfers may be controlled by the DMA controller 308 using information in the DMA pointer table block 310.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A method for communication, the method comprising:
    determining a set of hardware filters to use for identifying one or more particular packets in a data stream;
    assembling each hardware filter of said set from a plurality of minimum length hardware filters, wherein:
        a length of said each assembled hardware filter is a multiple of a length of one or more of said minimum length hardware filters; and
        said assembling of said each assembled hardware filter comprises concatenating two or more of said plurality of minimum length hardware filters until a combined length of said concatenated two or more of said plurality of minimum length hardware filters is equal to said length of said each assembled hardware filter; and
    filtering said one or more particular packets in said data stream using said determined set of hardware filters.

2. The method according to claim 1, wherein at least a portion of said each assembled hardware filter comprises a plurality of said minimum length hardware filters that are contiguously arranged.

3. The method according to claim 1, wherein at least a portion of said each assembled hardware filter comprises a plurality of said minimum length hardware filters that are non-contiguously arranged.

4. The method according to claim 1, comprising configuring said each assembled hardware filter using at least one filter coefficient.

5. The method according to claim 4, wherein said at least one filter coefficient is stored in a table in memory.

6. The method according to claim 1, comprising configuring said each assembled hardware filter using at least one filter mask.

7. The method according to claim 6, wherein said filter mask is at least one of the following: an inclusion mask and an exclusion mask.

8. The method according to claim 1, comprising storing at least a portion of said filtered specific message to memory.

9. The method according to claim 8, wherein said storing occurs via direct memory access transfers.

10. The method according to claim 1, wherein said each assembled hardware filter and at least one of said minimum length hardware filters used in assembling said each assembled hardware filter are integrated within a single chip.

11. A non-transitory machine-readable storage medium having stored thereon, a computer program having at least one code section for communication, the at least one code section being executable by a machine for causing the machine to perform steps comprising:
    determining a set of hardware filters to use for identifying one or more particular packets in a data stream;
    assembling each hardware filter of said set from a plurality of minimum length hardware filters, wherein:
        a length of said each assembled hardware filter is a multiple of a length of one or more of said minimum length hardware filters; and
        said assembling of said each assembled hardware filter comprises concatenating two or more of said plurality of minimum length hardware filters until a combined length of said concatenated two or more of said plurality of minimum length hardware filters is equal to said length of said each assembled hardware filter; and
    filtering said one or more particular packets in said data stream using said determined set of hardware filters.

12. The machine-readable storage according to claim 11, wherein at least a portion of said each assembled hardware filter comprises a plurality of said minimum length hardware filters that are contiguously arranged.

13. The machine-readable storage according to claim 11, wherein at least a portion of said each assembled hardware filter comprises a plurality of said minimum length hardware filters that are non-contiguously arranged.

14. The machine-readable storage according to claim 11, wherein said at least one code section comprises code for configuring said each assembled hardware filter using at least one filter coefficient.

15. The machine-readable storage according to claim 14, wherein said at least one filter coefficient is stored in a table in memory.

16. The machine-readable storage according to claim 11, wherein said at least one code section comprises code for configuring said each assembled hardware filter using at least one filter mask.

17. The machine-readable storage according to claim 16, wherein said filter mask is at least one of the following: an inclusion mask and an exclusion mask.

18. The machine-readable storage according to claim 11, wherein said at least one code section comprises code for storing at least a portion of said filtered specific message to memory.

19. The machine-readable storage according to claim 18, wherein said storing occurs via direct memory access transfers.

20. The machine-readable storage according to claim 11, wherein said each assembled hardware filter and said at least one of said minimum length hardware filters used in assembling said each assembled hardware filter are integrated within a single chip.

21. A system for processing information in a data stream, the system comprising:
   circuitry that enables determination of a set of hardware filters to use for identifying one or more particular packets in a data stream;
   circuitry that enables assembling of each hardware filter of said set from a bank of minimum length hardware filters, wherein:
      a length of said each assembled hardware filter is a multiple of a length of one or more of said minimum length hardware filters; and
      said assembling of said each assembled hardware filter comprises concatenating two or more of said bank of said minimum length hardware filters until a combined length of said concatenated two or more of said bank of said minimum length hardware filters is equal to said length of said each assembled hardware filter; and
   circuitry that enables filtering of said one or more particular packets in said data stream using said determined set of hardware filters.

22. The system according to claim 21, wherein at least a portion of said each assembled hardware filter comprises a plurality of said minimum length hardware filters that are contiguously arranged.

23. The system according to claim 21, wherein at least a portion of said each assembled hardware filter comprises a plurality of said minimum length hardware filters that are non-contiguously arranged.

24. The system according to claim 21, comprising circuitry that enables configuring of said each assembled hardware filter using at least one filter coefficient.

25. The system according to claim 24, wherein said at least one filter coefficient is stored in a table in memory.

26. The system according to claim 21, comprising circuitry that enables configuring of said each assembled hardware filter using at least one filter mask.

27. The system according to claim 26, wherein said filter mask is at least one of the following: an inclusion mask and an exclusion mask.

28. The system according to claim 21, comprising circuitry that enables storing of at least a portion of said filtered specific message to memory.

29. The system according to claim 28, wherein said storing occurs via direct memory access transfers.

30. The system according to claim 21, wherein said each assembled hardware filter and said at least one of said minimum length hardware filters used in assembling said each assembled hardware filter are integrated within a single chip.

31. A method for communication, the method comprising:
   assembling a set of hardware filters to use for identifying one or more particular packets in a data stream, wherein:
      each hardware filter, in said set of hardware filters, is assembled from a plurality of minimum length hardware filters, wherein:
         a length of said each hardware filter is a multiple of a length of one or more of said minimum length hardware filters; and
         said assembling of said each hardware filter comprises concatenating two or more of said plurality of minimum length hardware filters until a combined length of said concatenated two or more of said plurality of minimum length hardware filters is equal to said length of said each hardware filter; and
   filtering said one or more particular packets in said data stream using said determined set of hardware filters.

32. The method according to claim 31, wherein at least a portion of said each assembled hardware filter comprises a plurality of said minimum length hardware filters that are contiguously arranged.

33. The method according to claim 31, wherein at least a portion of said each assembled hardware filter comprises a plurality of said minimum length hardware filters that are non-contiguously arranged.

34. The method according to claim 31, comprising configuring said each assembled hardware filter using at least one filter coefficient.

35. The method according to claim 34, wherein said at least one filter coefficient is stored in a table in memory.

36. The method according to claim 31, comprising configuring said each assembled hardware filter using at least one filter mask.

37. The method according to claim 36, wherein said filter mask is at least one of the following: an inclusion mask and an exclusion mask.

38. The method according to claim 31, comprising storing at least a portion of said filtered specific message to memory.

39. The method according to claim 38, wherein said storing occurs via direct memory access transfers.

40. The method according to claim 31, wherein said each assembled hardware filter and at least one of said minimum length hardware filters used in assembling said each assembled hardware filter are integrated within a single chip.

41. A system for communication, the system comprising:
   one or more circuits comprising a plurality of minimum length hardware filters, said one or more circuits being operable to assemble a set of hardware filters to use for identifying one or more particular packets in a data stream, wherein:

each hardware filter, in said set of hardware filters, is assembled from said plurality of minimum length hardware filters, wherein:
  a length of said each hardware filter is a multiple of a length of one or more of said minimum length hardware filters; and
  said assembling of said each hardware filter comprises concatenating two or more of said plurality of minimum length hardware filters until a combined length of said concatenated two or more of said plurality of minimum length hardware filters is equal to said length of said each hardware filter; and
said one or more circuits are operable to filter said one or more particular packets in said data stream using said determined set of hardware filters.

42. The system according to claim 41, wherein at least a portion of said each assembled hardware filter comprises a plurality of said minimum length hardware filters that are contiguously arranged.

43. The system according to claim 41, wherein at least a portion of said each assembled hardware filter comprises a plurality of said minimum length hardware filters that are non-contiguously arranged.

44. The system according to claim 41, wherein said one or more circuits are operable to configure said each assembled hardware filter using at least one filter coefficient.

45. The system according to claim 44, wherein said at least one filter coefficient is stored in a table in memory.

46. The system according to claim 41, wherein said one or more circuits are operable to configure said each assembled hardware filter using at least one filter mask.

47. The system according to claim 46, wherein said filter mask is at least one of the following: an inclusion mask and an exclusion mask.

48. The system according to claim 41, wherein said one or more circuits are operable to store at least a portion of said filtered specific message to memory.

49. The system according to claim 48, wherein said storing occurs via direct memory access transfers.

50. The system according to claim 41, wherein said each assembled hardware filter and at least one of said minimum length hardware filters used in assembling said each assembled hardware filter are integrated within a single chip.

* * * * *